United States Patent
Wang et al.

(10) Patent No.: US 12,365,624 B2
(45) Date of Patent: Jul. 22, 2025

(54) COATING FLUID, NON-COMBUSTIBLE INSULATION BOARD AND PREPARATION METHOD THEREFOR

(71) Applicant: BAODING VRD ENERGY SAVING TECHNOLOGY CO., LTD, Baoding (CN)

(72) Inventors: Dianbin Wang, Baoding (CN); Tengda Chen, Baoding (CN)

(73) Assignee: BAODING VRD ENERGY SAVING TECHNOLOGY CO., LTD, Baoding (CN)

(*) Notice: Subject to any disclaimer, the term of this patent is extended or adjusted under 35 U.S.C. 154(b) by 0 days.

(21) Appl. No.: 18/559,622

(22) PCT Filed: May 18, 2023

(86) PCT No.: PCT/CN2023/094941
§ 371 (c)(1),
(2) Date: Nov. 8, 2023

(87) PCT Pub. No.: WO2023/186183
PCT Pub. Date: Oct. 5, 2023

(65) Prior Publication Data
US 2024/0262746 A1 Aug. 8, 2024

(30) Foreign Application Priority Data
Mar. 31, 2022 (CN) .......................... 202210333969.5

(51) Int. Cl.
*C04B 16/08* (2006.01)
*C04B 111/00* (2006.01)
*C04B 111/28* (2006.01)
*C04B 111/40* (2006.01)

(52) U.S. Cl.
CPC ..... *C04B 16/08* (2013.01); *C04B 2111/00482* (2013.01); *C04B 2111/28* (2013.01); *C04B 2111/40* (2013.01)

(58) Field of Classification Search
CPC ..... C04B 14/303; C04B 14/305; C04B 16/08; C04B 2103/63; C04B 2111/00482; C04B 2111/28; C04B 2111/40; C04B 22/0013; C04B 22/066; C04B 2201/32; C04B 24/38; C04B 26/06; C04B 28/30
See application file for complete search history.

(56) References Cited

FOREIGN PATENT DOCUMENTS

| CN | 104086913 | 10/2014 | |
|----|-----------|---------|---|
| CN | 109021837 | 12/2018 | |
| CN | 109021837 Y | 12/2018 | |
| CN | 109094175 | 12/2018 | |
| CN | 109094175 Y | 12/2018 | |
| CN | 113248229 A | 8/2021 | |
| CN | 114804705 | 7/2022 | |
| KR | 20110126484 A | 11/2011 | |
| WO | 2008130132 Y | 10/2008 | |
| WO | WO-2008130132 A1 * | 10/2008 | ............ C08J 9/0066 |

OTHER PUBLICATIONS

IPEA (CNIPA), International Preliminary Report on Patentability of PCT/CN2023/094941, Nov. 13, 2023.
ISR of PCT/CN2023/094941.

* cited by examiner

*Primary Examiner* — Shuangyi Abu Ali
(74) *Attorney, Agent, or Firm* — Hemisphere Law, PLLC; Zhigang Ma

(57) ABSTRACT

The present application relates to the field of building insulation materials, and specifically discloses a coating fluid, a non-combustible insulation board and a preparation method therefor. The coating fluid comprises 30-60 parts of flame retardant, 20-40 parts of styrene-acrylic emulsion, 10-25 parts of arabic gum, 12-18 parts of titanium dioxide and 150-200 parts of water. The non-combustible insulation board is prepared from EPS particles, a grouting material and the coating fluid of the present application, the weight ratio of the coating fluid to the EPS particles to the grouting material is 0.6:(0.8-1.5):(12-20), and the non-combustible insulation board has the heat conductivity coefficient of below 0.045 w/m·k, the combustion grade of above A2 and the compressive strength of 0.12-0.18 MPa. The preparation method for a non-combustible insulation board is simple in operation, easy in control and suitable for mass production.

3 Claims, No Drawings

COATING FLUID, NON-COMBUSTIBLE INSULATION BOARD AND PREPARATION METHOD THEREFOR

TECHNICAL FIELD

The present application relates to the field of building insulation materials, and more particularly relates to a coating fluid, a non-combustible insulation board and a preparation method therefor.

BACKGROUND

The insulation board is mostly used for building external walls to protect the building external walls so as to achieve the effect of heat insulation. The insulation board has high insulation performance, a low heat conductivity coefficient and light weight and easy to manufacture. However, the insulation board has many problems such as poor stability, poor aging resistance and poor flame-retardant effect.

As the state attaches great importance to safety and fire prevention, the requirements for building insulation materials of external walls are also constantly increasing. Novel functional insulation boards are gradually developed and utilized, for example, a flame-retardant insulation board is to add a series of fireproof functional materials such as a part of perlite, silica, rock wool or slag wool to the insulation board so that the insulation boards made of inorganic materials have fire protection function. However, the addition of fireproof functional materials results in poor insulation performance, high heat conductivity coefficient and weight increment of the insulation board, and the safety of the external wall using the insulation board made of inorganic materials is reduced.

For the above reasons, a building insulation board for external walls which has high insulation performance, a low heat conductivity coefficient and good flame-retardant effect is required.

SUMMARY

In order to make the insulation board have better insulation performance and fireproof performance, the present application provides a coating fluid, a non-combustible insulation board and a preparation method therefor:

In the first aspect, the present application provides a coating fluid, comprising the following components in parts by weight: 30-60 parts of flame retardant, 20-40 parts of styrene-acrylic emulsion, 10-25 parts of arabic gum, 12-18 parts of titanium dioxide and 150-200 parts of water.

In the present application, the flame retardant, the styrene-acrylic emulsion, the arabic gum, the titanium dioxide and the water are mixed to prepare the coating fluid, expanded polystyrene (EPS) particles are immersed in the coating fluid, and the coating fluid is coated on the surface of each EPS particle under the action of the arabic gum. A flame-retardant layer is formed on the surface of each EPS particle under the synergistic action of the flame retardant and the styrene-acrylic emulsion, which can achieve good flame-retardant performance.

The immersed EPS particles are prepared into the insulation board. Under the action of the coating fluid, the bonding strength between the EPS particles is higher so that the insulation board is more stable and the anti-aging performance is improved. Finally, a grouting material is filled into the insulation board by a negative pressure process to obtain the non-combustible insulation board.

The styrene-acrylic emulsion is prepared from styrene and acrylate monomer by emulsion copolymerization, and the styrene-acrylic emulsion has the solid content of 47%-49%, the pH value of 7-9 and the viscosity of 1000-4000 cps (Brookfield viscometer LVT4 #/60 RPM/25° C.).

The non-combustible insulation board has the heat conductivity coefficient of below 0.045 w/m·k, the combustion grade of above A2 and the compressive strength of 0.12-0.18 MPa, indicating that the non-combustible insulation board prepared by the present application has better insulation performance, flame-retardant effect, compressive strength and environmental protection performance than the existing insulation board.

The flame retardant, styrene-acrylic emulsion, arabic gum, titanium dioxide and water are mixed according to the weight ratio of (30-60 parts)/(20-40 parts)/(10-25 parts)/(12-18 parts)/(150-200 parts) to obtain the coating fluid, then the coating fluid is used for preparation of the non-combustible insulation board, and the obtained non-combustible insulation board has higher insulation performance and flame-retardant effect.

In one embodiment, the coating fluid comprises 40 parts of flame retardant, 30 parts of styrene-acrylic emulsion, 18 parts of arabic gum, 15 parts of titanium dioxide and 180 parts of water. The coating fluid prepared according to the above proportion is used for preparation of the non-combustible insulation board, and the non-combustible insulation board has the heat conductivity coefficient of 0.041 w/m·k, the combustion grade of A2 and the compressive strength of 0.15 MPa.

In one embodiment, the flame retardant is selected from zinc borate, magnesium hydroxide and aluminum hydroxide.

In one embodiment, the flame retardant is the mixture of zinc borate, magnesium hydroxide and aluminum hydroxide, and the weight ratio of the zinc borate to the magnesium hydroxide to the aluminum hydroxide is 1:(0.8-1.2):(1-2).

In the present application, the flame retardant is optionally zinc borate, magnesium hydroxide or aluminum hydroxide. Zinc borate, magnesium hydroxide and aluminum hydroxide can also be used in combination. Exemplarily, the flame retardant comprises zinc borate and magnesium hydroxide; the flame retardant comprises zinc borate and aluminum hydroxide; and the flame retardant comprises magnesium hydroxide and aluminum hydroxide.

In one embodiment, the flame retardant is the mixture of zinc borate, magnesium hydroxide and aluminum hydroxide, and the weight ratio of the zinc borate to the magnesium hydroxide to the aluminum hydroxide is 1:1:2.

In the second aspect, the present application provides a non-combustible insulation board, comprising the coating fluid of the present application, EPS particles and a grouting material, and the weight ratio of the coating fluid to the EPS particles to the grouting material is 0.6:(0.8-1.5):(12-20). With the above technical solution, the EPS particles are immersed in the coating fluid and coated with the coating fluid, and after the EPS particles are heated for pre-expansion, the EPS particles are heated in a mold into an insulation board with a closed cell structure. The insulation board has certain porosity due to the special structure. Therefore, the grouting material is filled into pores of the insulation board to obtain a non-combustible insulation board with high strength.

When the coating fluid, the EPS particles and the grouting material are prepared into the non-combustible insulation board according to the weight ratio of 0.6:(0.8-1.5):(12-20), the non-combustible insulation board has good insulation performance, flame-retardant performance and compressive strength. When the amount of the coating fluid and the grouting material is unchanged, the heat conductivity coefficient of the non-combustible insulation board gradually decreases and the compressive strength gradually increases with the increase of the amount of the EPS particles; and when the EPS particles are increased to a certain proportion, the heat conductivity coefficient and the compressive strength of the non-combustible insulation board remain unchanged. When the amount of the coating fluid and the EPS particles is unchanged, the heat conductivity coefficient and the compressive strength of the non-combustible insulation board gradually increase with the increase of the amount of the grouting material.

Exemplarily, the weight ratio of the coating fluid to the EPS particles to the grouting material may be 0.6:0.8:16, 0.6:1:16, 0.6:1.5:16, 0.6:1:12, and 0.6:1:20.

In one embodiment, the grouting material comprises magnesium oxide and magnesium sulfate, and the weight ratio of the magnesium oxide to the magnesium sulfate is 1:(0.8-1).

In one embodiment, the weight ratio of the magnesium oxide to the magnesium sulfate is 1:1.

In one embodiment, the viscosity of the grouting material is 12-16 Pa·s.

In one embodiment, the viscosity of the grouting material is 14 Pa·s.

The grouting material is a magnesium oxysulfate cementing material prepared from magnesium oxide and magnesium sulfate, and the magnesium oxysulfate cementing material is commonly used in the building field. In the present application, the main concern is the amount ratio of magnesium oxide to magnesium sulfate and the viscosity of the magnesium oxysulfate cementing material. The smaller the viscosity value of the magnesium oxysulfate cementing material is, the sparser the magnesium oxysulfate cementing material is, the better the fluidity is; and the larger the viscosity value of the magnesium oxysulfate cementing material is, the thicker the magnesium oxysulfate cementing material is, the worse the fluidity is.

When other conditions remain unchanged, the heat conductivity coefficient of the non-combustible insulation board increases after decrease and the compressive strength increases after decrease with the gradual increase of the viscosity value of the magnesium oxysulfate cementing material. When the viscosity of the grouting material is 12-16 Pa·s, that is, the viscosity of the magnesium oxysulfate cementing material is 12-16 Pa·s, the non-combustible insulation board has the heat conductivity coefficient of below 0.045 w/m·k, the compressive strength of about 0.15 MPa and the combustion grade of above A2.

In the third aspect, the present application provides a preparation method for a non-combustible insulation board, adopting the following technical solution:

A preparation method for a non-combustible insulation board, comprising the following steps:

S1: immersing EPS particles in the coating fluid prepared by the present application;

S2: preparing the fully immersed EPS particles into an insulation board;

S3: filling the grouting material into the insulation board by a negative pressure process to obtain the non-combustible insulation board, wherein the pressure of the negative pressure process is −0.6 to −0.7 Mbar.

In the present application, firstly, the flame retardant, styrene-acrylic emulsion, arabic gum, titanium dioxide and water are mixed according to the corresponding proportion to prepare the coating fluid, and the EPS particles are immersed in the coating fluid for about 5 h; and then the EPS particles immersed in the coating fluid are prepared into the insulation board, and the grouting material is filled into the insulation board by a negative pressure process at a pressure of −0.6 to −0.7 Mbar to obtain the non-combustible insulation board. The non-combustible insulation board has the heat conductivity coefficient of below 0.045 w/m·k, the combustion grade of above A2 and the compressive strength of 0.12-0.18 MPa.

Generally, the EPS insulation board has the heat conductivity coefficient of 0.039-0.041 w/m·k, the compressive strength of below 0.1 MPa and the fireproof grade of B1. When an inorganic filler is added into the EPS insulation board to prepare the EPS insulation board with fireproof performance, the fireproof performance of the EPS insulation board can be improved to A2, but the heat conductivity coefficient of the EPS insulation board is increased to above 0.048 w/m·k, which greatly degrades the insulation performance of the EPS insulation board.

In the present application, the non-combustible insulation board is prepared from the coating fluid, the EPS particles and the grouting material, and the non-combustible insulation board has better insulation performance and higher fireproof performance. The non-combustible insulation board has the heat conductivity coefficient of below 0.045 w/m·k and the combustion grade of above A2. The heat conductivity coefficient of the non-combustible insulation board is maintained above 0.041 w/m·k. Considering the construction requirements of the site, the compressive strength of the non-combustible insulation board is required to be 0.12-0.2 MPa. When the compressive strength is below 0.12 MPa, the strength of the non-combustible insulation board is insufficient; and when the compressive strength is above 0.2 MPa, the strength of cement mortar is also required to increase, so the compressive strength of the non-combustible insulation board is preferably is 0.13-0.16 MPa.

In conclusion, the present application has the following beneficial effects:

1. In the present application, the EPS particles are coated with the coating fluid to form a protective layer, and then the grouting material is filled into the insulation board to obtain the non-combustible insulation board; and the non-combustible insulation board has higher insulation performance, flame-retardant performance and mechanical properties, and has the advantages of energy saving and environmental protection compared with the existing insulation board;

2. In the present application, the coating fluid, the EPS particles and the grouting material are prepared into the non-combustible insulation board according to the weight ratio of 0.6:(0.8-1.5):(12-20); and the non-combustible insulation board has the heat conductivity coefficient of below 0.045 w/m·k, the combustion grade of above A2 and the compressive strength of 0.12-0.18 MPa;

3. The weight ratio of the coating fluid to the EPS particles to the grouting material in the present application is preferably 0.6:1:16, and the prepared non-combustible insulation board has better flame-retardant effect, a lower heat conductivity coefficient and higher compressive strength;

4. The preparation method for a non-combustible insulation board of the present application has the advantages of simple operation and easy control, and is suitable for mass production.

DETAILED DESCRIPTION

The present application is further described below in detail in combination with embodiments.

The raw materials used in the present application are commercially available.

Preparation Example 1

4 kg of flame retardant, 3 kg of styrene-acrylic emulsion, 1.8 kg of arabic gum and 1.5 kg of titanium dioxide are added to a container, then 18 kg of water is added, and after mixing uniformly, a coating fluid is obtained, wherein the flame retardant is zinc borate, and the styrene-acrylic emulsion is purchased from Guangzhou JuLang Chemical Co., Ltd., with the model of SH7199A.

The differences between preparation examples 2-9 and preparation example 1 are shown in Table 1.

TABLE 1

Differences between Preparation Examples 2-9 and Preparation Example 1 (Unit: kg)

| Category | Styrene-acrylic emulsion | Arabic gum | Zinc borate |
|---|---|---|---|
| Preparation example 1 | 3 | 1.8 | 4 |
| Preparation example 2 | 2 | 1.8 | 4 |
| Preparation example 3 | 4 | 1.8 | 4 |
| Preparation example 4 | 3 | 1 | 4 |
| Preparation example 5 | 3 | 2.5 | 4 |
| Preparation example 6 | 3 | 1.8 | 3 |
| Preparation example 7 | 3 | 1.8 | 6 |

PREPARATION EXAMPLE 8

The different between preparation example 8 and preparation example 1 is that: the flame retardant in preparation example 8 is the mixture of zinc borate, magnesium hydroxide and aluminum hydroxide, wherein the weight ratio of the zinc borate to the magnesium hydroxide to the aluminum hydroxide is 1:1:2.

The differences between preparation examples 9-14 and preparation example 1 are shown in Table 2.

TABLE 2

Differences between Preparation Examples 9-14 and Preparation Example 1 (Unit: kg)

| Category | Styrene-acrylic emulsion | Arabic gum | Zinc borate |
|---|---|---|---|
| Preparation example 9 | 1.5 | 1.8 | 4 |
| Preparation example 10 | 4.5 | 1.8 | 4 |
| Preparation example 11 | 3 | 3 | 4 |
| Preparation example 12 | 3 | 0.5 | 4 |
| Preparation example 13 | 3 | 1.8 | 2.5 |
| Preparation example 14 | 3 | 1.8 | 6.5 |

EMBODIMENTS

Embodiment 1

0.6 kg of EPS particles are immersed in 1 kg of coating fluid for 5 h, wherein the coating fluid is prepared in preparation example 1; then the immersed EPS particles are prepared into an insulation board by a traditional process; finally, 16 kg of grouting material is filled into the insulation board by a negative pressure process to obtain the non-combustible insulation board, wherein the pressure of the negative pressure process is −0.6 Mbar; and the weight ratio of the coating fluid to the EPS particles to the grouting material is 0.6:1:16;

The grouting material is prepared from magnesium oxide and magnesium sulfate with water to adjust the viscosity to 14 Pa·s, and the weight ratio of the magnesium oxide to the magnesium sulfate is 1:1.

The differences between embodiments 2-14 and embodiment 1 are shown in Table 3.

TABLE 3

Parameters of Differences between Embodiments 2-14 and Embodiment 1

| Category | Coating fluid | Wight ratio of coating fluid to EPS particles to grouting material | Viscosity |
|---|---|---|---|
| Embodiment 1 | Preparation example 1 | 0.6:1:16 | 14 Pa · s |
| Embodiment 2 | Preparation example 2 | 0.6:1:16 | 14 Pa · s |
| Embodiment 3 | Preparation example 3 | 0.6:1:16 | 14 Pa · s |
| Embodiment 4 | Preparation example 4 | 0.6:1:16 | 14 Pa · s |
| Embodiment 5 | Preparation example 5 | 0.6:1:16 | 14 Pa · s |
| Embodiment 6 | Preparation example 6 | 0.6:1:16 | 14 Pa · s |
| Embodiment 7 | Preparation example 7 | 0.6:1:16 | 14 Pa · s |
| Embodiment 8 | Preparation example 8 | 0.6:1:16 | 14 Pa · s |
| Embodiment 9 | Preparation example 1 | 0.6:0.8:16 | 14 Pa · s |
| Embodiment 10 | Preparation example 1 | 0.6:1.5:16 | 14 Pa · s |
| Embodiment 11 | Preparation example 1 | 0.6:1:12 | 14 Pa · s |
| Embodiment 12 | Preparation example 1 | 0.6:1:20 | 14 Pa · s |
| Embodiment 13 | Preparation example 1 | 0.6:1:16 | 12 Pa · s |
| Embodiment 14 | Preparation example 1 | 0.6:1:16 | 16 Pa · s |

The differences between reference examples 1-10 and embodiment 1 are shown in Table 4.

TABLE 4

Parameters of Differences between Reference Examples 1-10 and Embodiment 4

| Category | Coating fluid | Wight ratio of coating fluid to EPS particles to grouting material | Viscosity |
|---|---|---|---|
| Reference example 1 | Preparation example 9 | 0.6:1:16 | 14 Pa · s |
| Reference example 2 | Preparation example 10 | 0.6:1:16 | 14 Pa · s |
| Reference example 3 | Preparation example 11 | 0.6:1:16 | 14 Pa · s |
| Reference example 4 | Preparation example 12 | 0.6:1:16 | 14 Pa · s |
| Reference example 5 | Preparation example 13 | 0.6:1:16 | 14 Pa · s |
| Reference example 6 | Preparation example 14 | 0.6:1:16 | 14 Pa · s |
| Reference example 7 | Preparation example 1 | 0.6:1.7:16 | 14 Pa · s |
| Reference example 8 | Preparation example 1 | 0.6:1:22 | 14 Pa · s |
| Reference example 9 | Preparation example 1 | 0.6:1:16 | 10 Pa · s |
| Reference example 10 | Preparation example 1 | 0.6:1:16 | 18 Pa · s |

Reference Example 11

The difference between reference example 11 and embodiment 1 is that no coating fluid is contained in reference example 11.

Reference Example 12

The difference between reference example 12 and embodiment 1 is that no grouting material is contained in reference example 12.

Reference Example 13

The difference between reference example 13 and embodiment 1 is that the flame retardant is not added into the coating fluid but into the grouting material in reference example 13.

Reference Example 14

The difference between reference example 14 and embodiment 1 is that the non-combustible insulation board in reference example 14 is prepared in the following steps:
S1: preparing the EPS particles into an insulation board;
S2: mixing the coating fluid and the grouting material, and filling the mixture into the insulation board by a negative pressure process to obtain the non-combustible insulation board.

Non-combustible insulation boards prepared in embodiments 1-14 of the present application and non-combustible insulation boards prepared in reference examples 1-14 are subjected to performance tests, including heat conductivity coefficient, combustion performance and compressive strength. The specific test results are shown in Table 5, wherein the test of the heat conductivity coefficient is given in GB/T10294; the test of the combustion performance is given in GB8624-2006; and the test of the compressive strength is given in GB/T5486-2008.

TABLE 5

Test Results of Non-combustible Insulation Board

| Category | Heat Conductivity Coefficient (w/m · k) | Combustion Performance | Compressive Strength MPa |
|---|---|---|---|
| Embodiment 1 | 0.041 | A2 | 0.15 |
| Embodiment 2 | 0.042 | A2 | 0.14 |
| Embodiment 3 | 0.042 | A2 | 0.16 |
| Embodiment 4 | 0.043 | A2 | 0.12 |
| Embodiment 5 | 0.042 | A2 | 0.17 |
| Embodiment 6 | 0.041 | A2 | 0.14 |
| Embodiment 7 | 0.041 | A2 | 0.13 |
| Embodiment 8 | 0.042 | A2 | 0.14 |
| Embodiment 9 | 0.045 | A2 | 0.12 |
| Embodiment 10 | 0.041 | A2 | 0.17 |
| Embodiment 11 | 0.041 | A2 | 0.13 |
| Embodiment 12 | 0.043 | A2 | 0.18 |
| Embodiment 13 | 0.045 | A2 | 0.14 |
| Embodiment 14 | 0.043 | A2 | 0.15 |
| Reference example 1 | 0.047 | A2 | 0.12 |
| Reference example 2 | 0.048 | A2 | 0.14 |
| Reference example 3 | 0.046 | A2 | 0.11 |
| Reference example 4 | 0.044 | A2 | 0.11 |
| Reference example 5 | 0.041 | B1 | 0.10 |
| Reference example 6 | 0.041 | A2 | 0.11 |
| Reference example 7 | 0.051 | A2 | 0.10 |
| Reference example 8 | 0.053 | A1 | 0.22 |
| Reference example 9 | 0.055 | A2 | 0.22 |
| Reference example 10 | 0.057 | A2 | 0.11 |
| Reference example 11 | 0.042 | B1 | 0.12 |
| Reference example 12 | 0.045 | B1 | 0.13 |
| Reference example 13 | 0.057 | A2 | 0.23 |
| Reference example 14 | 0.059 | B1 | 0.27 |

It can be seen from embodiments 1-14 and reference examples 1-14 in combination with Table 5 that the non-combustible insulation boards prepared in embodiments 1-14 have a lower heat conductivity coefficient, a higher combustion grade and higher compressive strength, indicating that the non-combustible insulation boards have better insulation performance and flame-retardant effect.

The non-combustible insulation boards prepared in embodiments 1-14 have the heat conductivity coefficient of below 0.045 w/m·k, the combustion grade of above A2 and the compressive strength of 0.12-0.18 MPa.

It can be seen from embodiments 1-3 and reference examples 1-2 in combination with Table 5 that when other conditions remain unchanged, the heat conductivity coefficient of the non-combustible insulation board increases after decrease with the increase of the amount of the styrene-acrylic emulsion.

It can be seen from embodiments 1, 6, 7, 8 and reference examples 5-6 in combination with Table 5 that when other conditions remain unchanged, the combustion grade of the non-combustible insulation board gradually increases from B1 to A2 with the increase of the amount of the flame retardant zinc borate. It can be seen from embodiment 1 and reference examples 11-12 in combination with Table 5 that when no coating fluid or grouting material is added in the process of preparing the non-combustible insulation board, the heat conductivity coefficient and the compressive strength of the non-combustible insulation board meet the requirements, but the flame-retardant performance of the non-combustible insulation board is poor.

It can be seen from embodiment 1 and reference example 13 in combination with Table 5 that when the flame retardant is not added into the coating fluid but into the grouting material, the heat conductivity coefficient of the non-combustible insulation board is too high to meet the use requirements.

It can be seen from embodiment 1 and reference example 14 in combination with Table 5 that the process steps in reference example 14 are changed in that the coating fluid and the grouting material are mixed and then filled into the insulation board, and the obtained non-combustible insulation board has poor performance and has a heat conductivity coefficient of 0.059 w/m·k and the combustion grade of B1.

The present specific embodiment is only an explanation of the present application, not a limitation of the present application. Those skilled in the art can make amendments without creative contribution to the present embodiment as required after reading the description, and the amendments are protected by the patent law within the scope of the claims of the present application.

The invention claimed is:

1. A non-combustible insulation board, comprising expanded polystyrene particles, a grouting material and a coating fluid,
   wherein a weight ratio of the coating fluid to the expanded polystyrene particles to the grouting material is 0.6:(0.8-1.5):(12-20);
   wherein the coating fluid comprises the following components in parts by weight: 30-60 parts of flame retardant, 20-40 parts of styrene-acrylic emulsion, 10-25 parts of arabic gum, 12-18 parts of titanium dioxide and 150-200 parts of water;
   wherein a viscosity of the grouting material is 12-16 Pa·s;
   wherein the styrene-acrylic emulsion is prepared from styrene and acrylate monomer by emulsion copolymerization, and the styrene-acrylic emulsion has a solid content of 47%-49%, a pH value of 7-9 and a viscosity of 1000-4000 cps;
   wherein the flame retardant is a mixture of zinc borate, magnesium hydroxide and aluminum hydroxide, and a weight ratio of the zinc borate to the magnesium hydroxide to the aluminum hydroxide is 1:1:2;
   wherein the grouting material comprises magnesium oxide and magnesium sulfate, and a weight ratio of the magnesium oxide to the magnesium sulfate is 1:1;
   and wherein the non-combustible insulation board is made from a preparation method comprises the following steps:
   S1: immersing the expanded polystyrene particles in the coating fluid, the expanded polystyrene particles are coated with the coating fluid;
   S2: preparing fully immersed expanded polystyrene particles into an insulation board and after heating expanded polystyrene particles for pre-expansion, heating expanded polystyrene particles in a mold into an insulation board with a closed cell structure, the insulation board has pores; and
   S3: filling the grouting material into pores of the insulation board by a negative pressure process to obtain the non-combustible insulation board.

2. The non-combustible insulation board according to claim 1, wherein the coating fluid comprises 40 parts of flame retardant, 30 parts of styrene-acrylic emulsion, 18 parts of arabic gum, 15 parts of titanium dioxide and 180 parts of water.

3. The non-combustible insulation board according to claim 1, wherein the viscosity of the grouting material is 14 Pa·s.

* * * * *